United States Patent [19]
Sun et al.

[11] Patent Number: 5,937,062
[45] Date of Patent: Aug. 10, 1999

[54] HINGE MODULE FOR MOUNTING A FLIP ONTO A PORTABLE TELEPHONE SET

[75] Inventors: Hsueh-Wen Sun, Taipei; Yin-Shiang Cheng, Taipei Hsien, both of Taiwan

[73] Assignee: Acer Peripherals, Inc., Taiwan

[21] Appl. No.: 08/960,234

[22] Filed: Oct. 29, 1997

[51] Int. Cl.[6] .............................. H04M 1/00; H04B 1/38; E05D 11/10

[52] U.S. Cl. ........................... 379/433; 379/428; 455/90; 455/575; 16/330; 16/334; 16/329; 16/325

[58] Field of Search ..................................... 379/433, 428; 455/90, 575; 16/330, 334, 329, 325

[56] References Cited

U.S. PATENT DOCUMENTS

| | | | |
|---|---|---|---|
| 5,125,131 | 6/1992 | Leblanc | 16/330 |
| 5,408,726 | 4/1995 | Kent | 16/326 |
| 5,799,371 | 9/1998 | Lin | 16/330 |

*Primary Examiner*—Jack Chiang
*Assistant Examiner*—Keithley Crooks
*Attorney, Agent, or Firm*—Pillsbury Madison & Sutro LLP

[57] ABSTRACT

A hinge module for mounting a flip onto a portable telephone set. The hinge module uses a retractable member so the flip can be easily mounted onto the handset. The retractable member includes a shaft movably received in a tube, which also functions as a rotating shaft so no additional rotating shaft is needed.

7 Claims, 6 Drawing Sheets

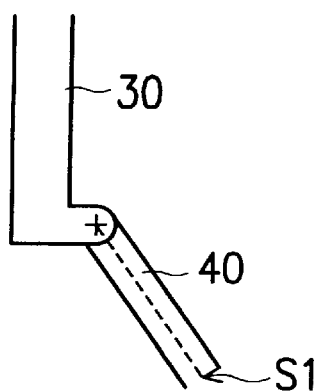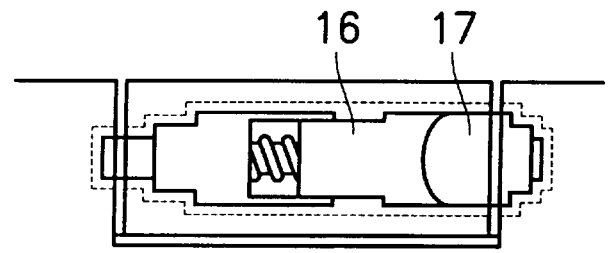
FIG. 5A  FIG. 5B
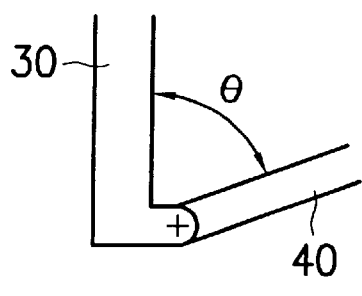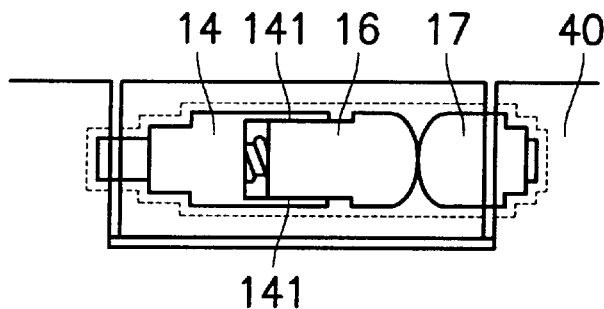
FIG. 5C  FIG. 5D
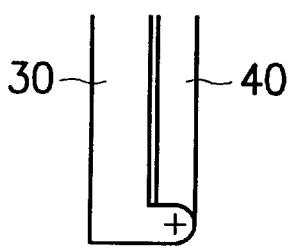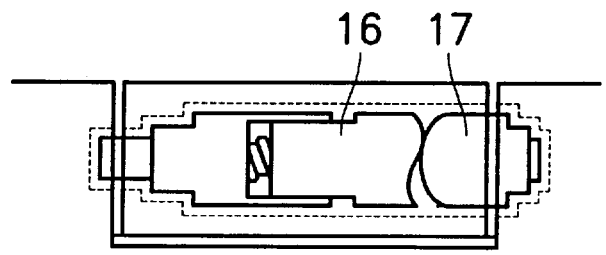
FIG. 5E  FIG. 5F

5,937,062

HINGE MODULE FOR MOUNTING A FLIP ONTO A PORTABLE TELEPHONE SET

BACKGROUND OF THE INVENTION

1. Field of the invention

The present invention relates to a hinge module for mounting a flip onto a portable telephone set or any other similar device.

2. Description of Related Art

A portable telephone set with a flip uses a hinge to mount the flip onto the handset so that the flip can swing freely to its open or closed position. There are many kinds of hinges designed for this purpose. However, for most of these designs, in the mounting of the flip using the hinges, auxiliary tools or components such as screws and caps must be used, and thus complicates the mounting process. Moreover, in order to make the flip in a predetermined position when it is opened, an additional rotating shaft is necessary for most conventional designs. In some designs two hinges are used to mount a flip onto a handset.

SUMMARY OF THE INVENTION

It is therefore an object of the invention to provide a hinge module for mounting a flip onto a handset of a portable telephone to eliminate the above disadvantages.

The hinge module of the invention uses a retractable member which is fitted in a first cam member, a corresponding second cam member for cooperating with the first cam member, a guiding member, and a biasing means disposed between the second cam member and the guiding member. The first cam member has an engaging portion for engaging with the flip or the handset, and the guiding member also has an engaging portion for engaging with the handset or the flip. The retractable member includes a shaft which is retractably received in a tube and also functions as a rotating shaft. One end of the retractable member is fixed on the first cam member and the other end is protruded from the guiding member when the hinge module is assembled.

By using the hinge module of the invention, the flip can be easily mounted onto the handset and the clip can automatically swing to its position when it is opened, and no other auxiliary tools or components or rotating pins are necessary for the mounting, hence the mounting time is saved.

BRIEF DESCRIPTION OF THE DRAWINGS

The present invention can be more fully understood by reading the subsequent detailed description of the preferred embodiments with reference made to the accompanying drawings, wherein:

FIGS. 5A, 5C, and 5E are schematic views respectively showing three different operating positions of a flip of a portable telephone set;

FIGS. 5B, 5D, and 5F are schematic views showing respectively the operating states of the hinge module of the first embodiment of the invention when the flip is respectively in the operating positions as shown in FIGS. 5A, 5C and 5E;

DETAILED DESCRIPTION OF THE PREFERRED EMBODIMENTS

Figure 1:
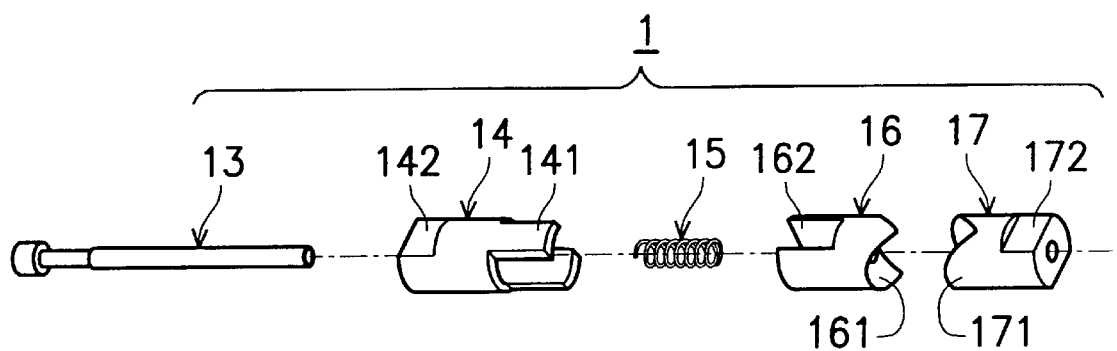
FIG. 1 is an exploded perspective view of the hinge module according to a first preferred embodiment of the invention.

Referring to FIG. 1, which is an exploded perspective view of the hinge module 1 according to a first preferred embodiment of the invention, the hinge module 1 includes a telescopic member 13, a guide 14, a spring 15, a first cam member 17, and a second cam member 16. The second cam member 16 includes a curved portion 161. The first cam member 17 includes a corresponding curved portion 171 for fitting the curved portion 161 of the second cam member 16, thus the second cam member 16 can cooperate with the first cam member 17. The guide 14 includes a pair of extended arms 141, 141. The second cam member 16 includes a pair of corresponding guiding slots 162, 162 so that the extended arms 141, 141 can be received in the guiding slots 162, 162 with the spring 15 being biased in-between when the hinge module 1 is assembled. The first cam member 17 includes an engaging portion 172 designed for engaging with the flip to be mounted. The guide 14 includes an engaging portion 142 designed for engaging with the handset of a portable telephone (not shown).

Figure 2A:
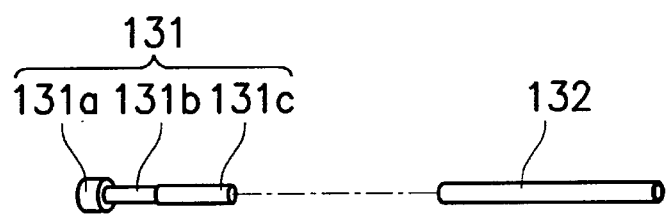
FIG. 2A is an exploded perspective view of the telescopic member of the hinge module according to the first preferred embodiment.
Figure 2B:
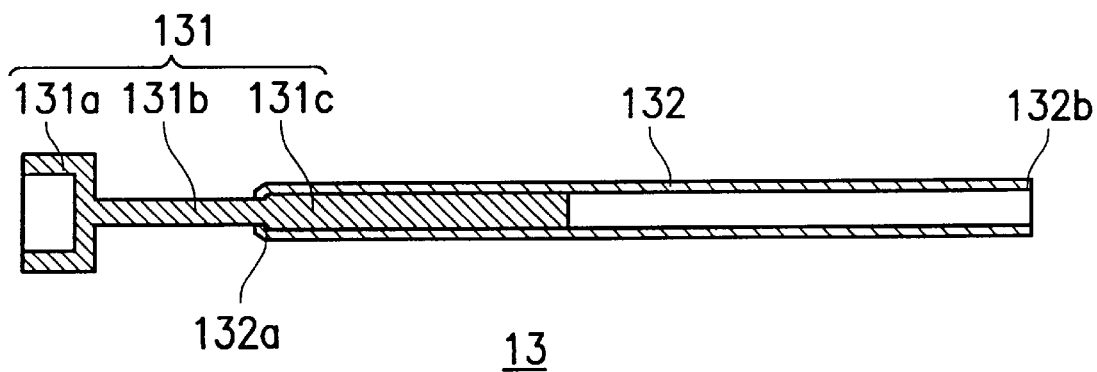
FIG. 2B is a sectional view showing the assembled telescopic member of the hinge module of FIG. 2A.

Referring now to FIG. 2A and FIG. 2B, the telescopic member 13 includes a straight shaft 131 and a tube 132. The shaft 131 includes a head 131a, a first section 131b and a second section 131c with the first section 131b having a smaller diameter than the second section 131c. The shaft 131 is retractably mounted through an opening 132a in the tube 132 either to an extended position or to a retracted position. When the shaft 131 is in its extended position, the entire first section 131b is substantially disposed externally of the tube 132, and when the shaft 131 is in its retracted position, the head 131a abuts against the opening 132a.

Figure 3A:
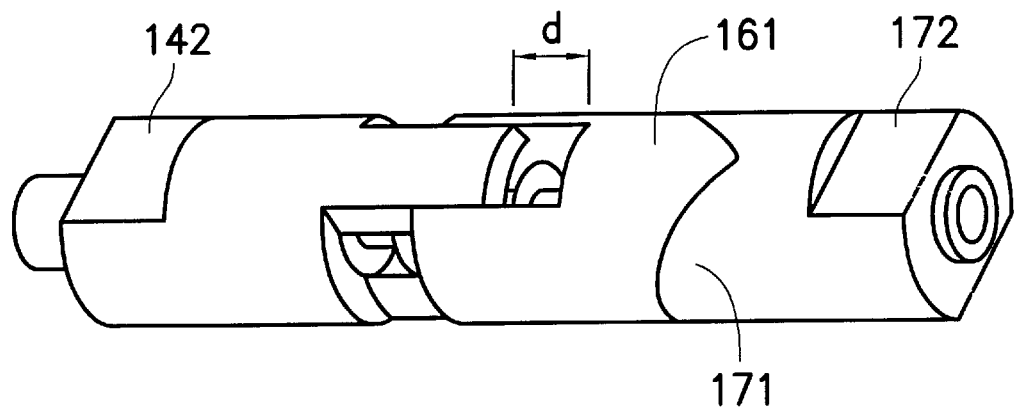
FIG. 3A is a perspective view showing the assembled hinge module of the hinge module of FIG. 1.
Figure 3B:
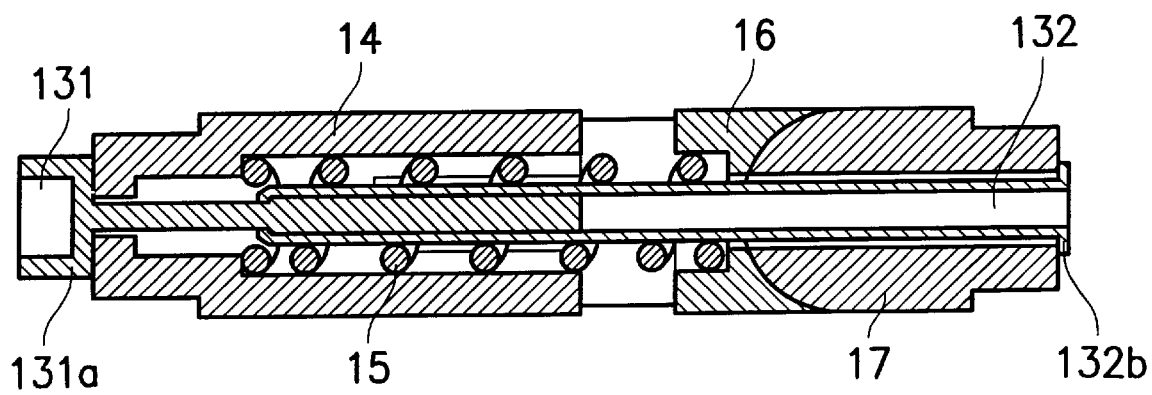
FIG. 3B is a sectional view of the hinge module of FIG. 3A.

Referring now to FIG. 3a and FIG. 3b, the hinge module 1 is assembled by coupling the first cam member 17 and the second cam member 16 together, loading the spring 15 between the guide 14 and the first cam member 17, inserting the telescopic member 13 through the guide 14, the spring 15, the first cam member 17 and the second cam member 16, and then riveting the end 132b of the tube 132 to the end of the first cam member 17. Note that when the hinge module 1 is assembled, a gap d is formed between the ends of the extended arms 141, 141 and the bottoms of the guiding slots 161, 161.

Figure 4A:
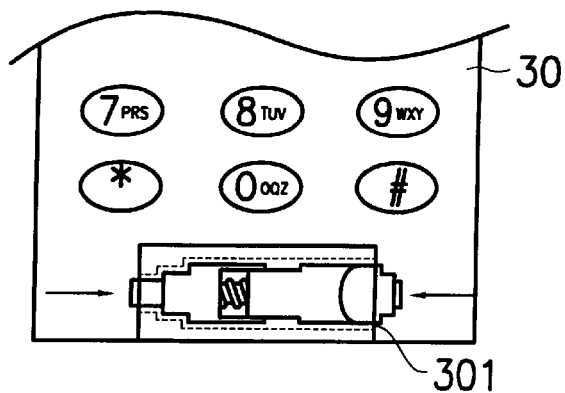
FIGS. 4A–4C are schematic views showing steps of mounting a flip onto a handset of a portable telephone using the hinge module of the first embodiment of the invention.
Figure 4B:
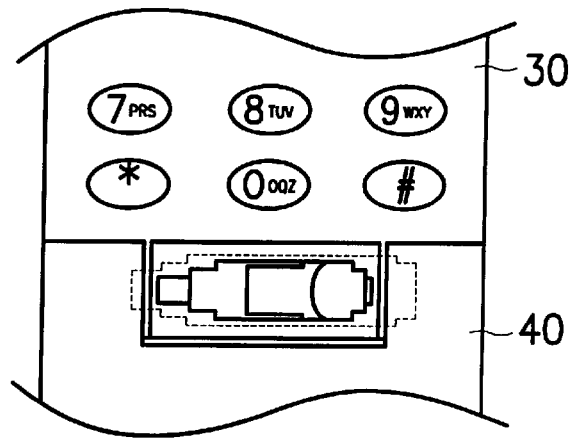
Figure 4C:
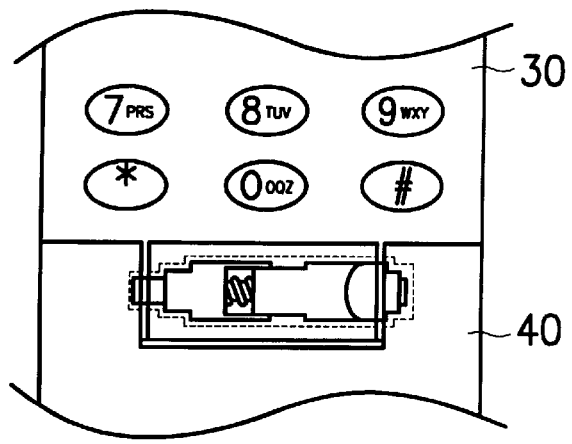

FIGS. 4a, 4b and 4c show steps of mounting a flip 40 onto a handset 30 using the hinge module 1 of the invention. In mounting the flip 40 onto the handset 30, the hinge module 1 is first loaded into a groove 301 formed at the bottom of the handset 30 (FIG. 4A). The two ends of the assembled hinge module 1 are then pressed against each other (FIG. 4B). When the two ends of the hinge module 30 are pressed against each other, the shaft 131 is retracted in the tube 132, and the head 131a urges the guide 14 to move toward the second cam member 16 so that the spring 15 is biased. The gap d provides the space for the movement of the guide 14 toward the second cam member 16. And then the flip 40 is fitted into the groove 301. The two pressed ends of the assembled hinge module 1 are then released. And thus the engaging portion 172 of the first cam member 17 is automatically engaged with a groove (not shown) formed in the flip 30 and the engaging portion 142 of the guide 14 is engaged with the handset 30 to finish the mounting. The mounting process is simple and needs no additional tools or components.

Note that by the above structure, when the flip 40 is rotated with respect to the handset 30, the second cam member 16 is rotated with respect to the guide 14. This changes the contact position of the curved portion 171 of the first cam member 17 with the curved portion 161 of the second cam member 16. And thus when the curved portion 161 is not completely coupled with the curved portion 171, a torsion is generated to make the first cam member 17 rotate with respect to the second cam member 16.

The operation of the hinge module 1 is hereinafter described in detail with reference to FIGS. 5A–5F.

Referring to FIGS. 5A and 5B, when the flip 40 is in a predetermined position S1, i.e., in a position that the flip 40 is fully opened, the second cam member 16 is completely coupled with the first cam member 17.

Referring to FIGS. 5C and 5D, when the flip 40 is opened or closed, the first cam member 17 rotates by the opening or closing operation of the flip 40, and thus urges the second cam member 16 to move backward. When the flip 40 is rotated to a critical angle θ, the second cam member 16 is in contact with the first cam member 17 at only one point, and thus the flip 40 is in an unstable position. Accordingly, the flip 40 will shift to a fully opened position or to a closed position from the unstable position as long as the flip 40 is caused to move.

FIG. 5E shows the clip 40 is in its closed position. FIG. 5F shows the relative positions of the second cam member 16 and the first cam member 17 when the flip 40 is in its closed position as shown in FIG. 5E.

Figure 6:
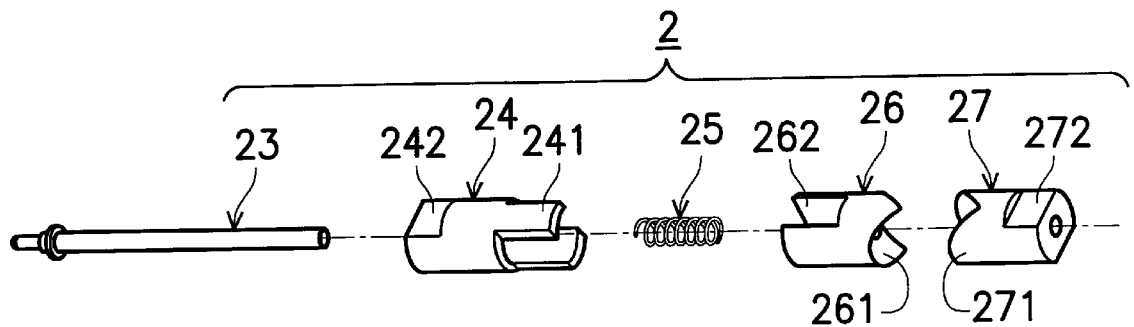
FIG. 6 is an exploded view of the hinge module according to a second preferred embodiment of this invention.

FIG. 6 is an exploded perspective view of the hinge module 2 according to a second preferred embodiment of the invention. The hinge module 2 includes a telescopic member 23, a guide 24, a spring 25, a second cam member 26, and a first cam member 27. The second cam member 26 includes a curved portion 261. The first cam member 27 includes a corresponding curved portion 271 for fitting the curved portion 261 of the second cam member 26, and thus the second cam member 26 can cooperate with the first cam member 27. The guide 24 includes a pair of extended arms 241, 241. The second cam member 26 includes a pair of corresponding guiding slots 262, 262 so that the extended arms 241, 241 can be received in the guiding slots 262, 262 with the spring 25 being biased in-between when the hinge module 2 is assembled. The first cam member 27 includes an engaging portion 272 designed for engaging with a flip to be mounted. The guide 24 includes an engaging portion 242 designed for engaging with the handset of a portable telephone (not shown).

Note that the hinge module 2 has substantially the same structure as the hinge module 1 except for the telescopic member 23.

Figure 7A:
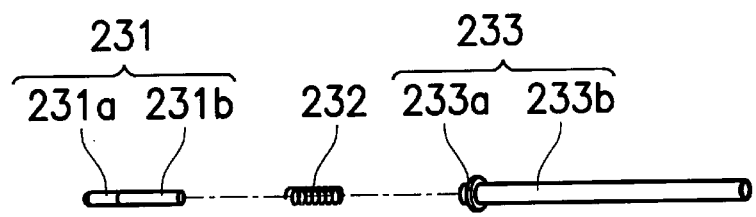
FIG. 7A is an exploded perspective view showing the telescopic member of the hinge module of FIG. 6.
Figure 7B:
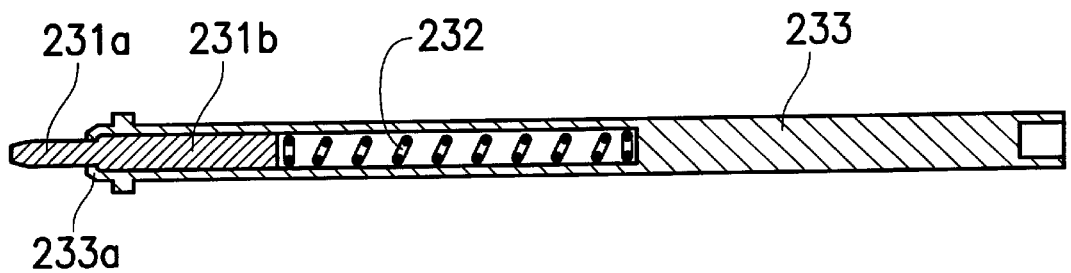
FIG. 7B is a sectional view showing the assembled telescopic member of the hinge module of FIG. 7A.

Referring to FIG. 7A and FIG. 7B, the telescopic member 23 includes a straight shaft 231, a spring 232 and a tube 233. The shaft 231 includes a first section 231a and a second section 231b, and the first section 231a has a smaller diameter than the second section 231b. One end of the tube 232 is contracted to form an opening 233a. When the second section 231b of the pin 231 and the spring 232 are received in the tube 233, and the telescopic member 23 is in its extended position, the first section 231a is protruded from the opening 233a. When the telescopic member 23 is in its retracted position, the first section 231a is received in the tube 233.

Figure 8A:
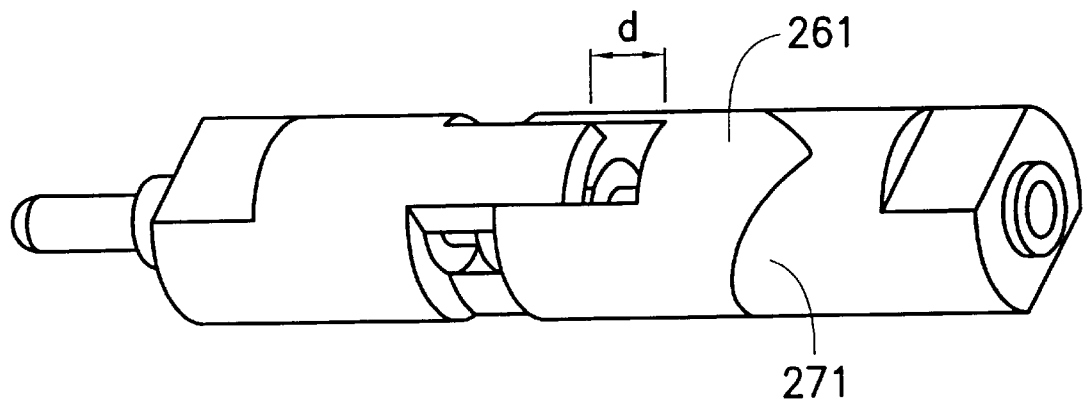
FIG. 8A is a perspective view showing the assembled hinge module of the hinge module of FIG. 6.
Figure 8B:
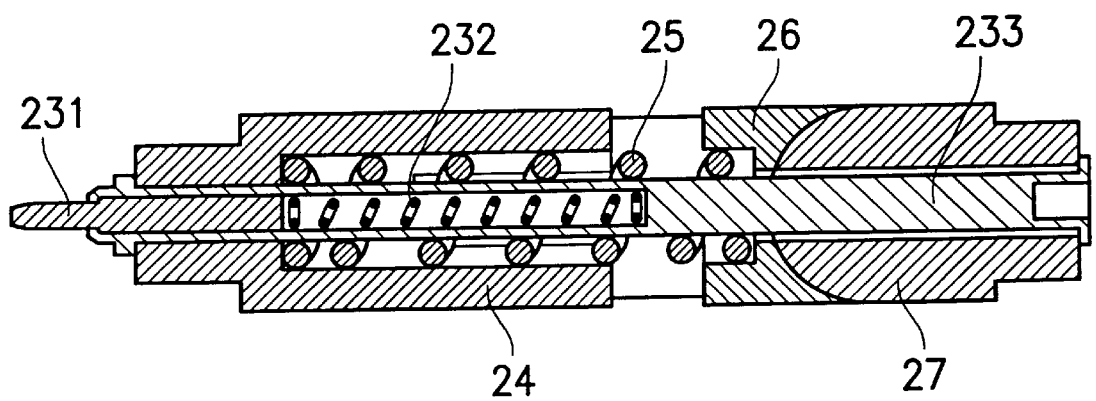
FIG. 8B is a sectional view of the hinge module of FIG. 8A.

The assembled hinge module 2 is shown in FIG. 8A and FIG. 8B. The assembling of the hinge module 2 and steps of mounting a flip onto a portable telephone set using the hinge module 2 are similar to those of the first embodiment and thus the description is omitted.

It is seen from the above two preferred embodiments that the hinge module is retractable due to the design of the telescopic member and thus the flip can be easily mounted on a handset by using the hinge module. Moreover, the shaft of the telescopic member also functions as a rotating shaft of the flip to make the flip in its appropriate position when it is opened or closed, and no additional rotating means is needed.

What is claimed is:

1. A hinge module for mounting a flip onto a device comprising:
   a first cam member having a first curved portion;
   a second cam member having a second curved portion corresponding to said first curved portion and cooperating with said first curved portion, wherein said first cam member is rotatable with respect to said second cam member in two opposing directions;
   a guiding member;
   an elastic member disposed between said second cam member and said guiding member to form a gap in between; and
   a retractable member fitted in said guiding member, said elastic member, said second cam member and said first cam member, with a first end thereof protruding from said first cam member and a second end protruding from said guiding member.

2. The hinge module for mounting a flip onto a device as claimed in claim 1, wherein said second cam member further comprises at least one slot, and said guiding member further comprises at least one extended arm for being received in said at least one slot.

3. The hinge module for mounting a flip onto a device as claimed in claim 1, wherein said retractable member is a telescopic member comprising a shaft and a tube, said shaft being retractably received in said tube.

4. The hinge module for mounting a flip onto a device as claimed in claim 3, wherein said tube has a contracted opening and said shaft has a head, a first section and a second section, said first section has a smaller diameter than said second section and said shaft is movably mounted through said contracted opening to a retracted position wherein substantially the entire first section is disposed externally of said tube, or to an extended position wherein said head abuts against said opening.

5. The hinge module for mounting a flip onto a device as claimed in claim 1, wherein said retractable member is a telescopic member comprising a shaft, a spring and a tube, wherein said shaft is retractably received in said tube and said spring is disposed between said shaft and said tube.

6. The hinge module for mounting a flip onto a device as claimed in claim 5, wherein said shaft comprises a first section and a second section, and said first section has a smaller diameter than said second section, one end of said tube is contracted to form an opening, and said shaft is movably mounted through said opening to an extended position wherein said first section is protruded from said opening, or to a retracted position wherein said first section is received in said tube.

7. The hinge module for mounting a flip onto an electrical device as claimed in claim 1, wherein said elastic member is a spring.

* * * * *